United States Patent

Grateau et al.

Patent Number: 5,288,669
Date of Patent: Feb. 22, 1994

[54] GLASSES WITH VERY HIGH INDEX OF REFRACTION AND LOW DENSITY

[75] Inventors: Luc Grateau, Paris; Pascale Laborde, Champagne Sur Seine; Michel Prassas, Vulaines Sur Seine, all of France

[73] Assignee: Corning France S.A., Avon Cedex, France

[21] Appl. No.: 17,183

[22] Filed: Feb. 12, 1993

[30] Foreign Application Priority Data

Apr. 22, 1992 [FR] France ............... 92 04918

[51] Int. Cl.$^5$ ............... C03C 3/068; C03C 3/066
[52] U.S. Cl. .................. 501/78; 501/901; 501/79
[58] Field of Search .................. 501/78, 901

[56] References Cited

U.S. PATENT DOCUMENTS

| | | | |
|---|---|---|---|
| 3,460,954 | 8/1969 | Young | 501/63 |
| 3,513,004 | 5/1970 | Kohut et al. | 501/78 |
| 4,213,786 | 7/1980 | Faulstich et al. | 501/78 |
| 4,213,787 | 7/1980 | Faulstich et al. | 501/74 |
| 4,390,638 | 6/1983 | Mennemann et al. | 501/77 |
| 4,439,531 | 3/1984 | Mennemann et al. | 501/75 |
| 4,472,511 | 9/1984 | Mennemann et al. | 501/78 |
| 4,526,874 | 7/1985 | Marszalek et al. | 501/77 |
| 4,584,279 | 4/1986 | Grabowski et al. | 501/78 |
| 4,612,295 | 9/1986 | Sagara | 501/51 |
| 4,732,876 | 3/1988 | Nagamine et al. | 501/78 |
| 4,742,028 | 5/1988 | Boudot et al. | 501/78 |
| 4,839,314 | 6/1989 | Boudot et al. | 501/78 |

FOREIGN PATENT DOCUMENTS 2010672 3/1970 Fed. Rep. of Germany.
1302526 3/1969 United Kingdom.

OTHER PUBLICATIONS

Derwent Publications Ltd., London, FB; AN 87-167506 & JP-A-62 100 449 (Ohara KK) May 9, 1987.
Derwent Publications Ltd., London, GB; AN 85-194363 & JP-A-60 122 745 (Hoya Corp.) Jul. 1, 1985.

Primary Examiner—Mark L. Bell
Assistant Examiner—David R. Sample
Attorney, Agent, or Firm—Clinton S. Janes, Jr.

[57] ABSTRACT

This invention relates to glasses exhibiting refractive indices higher than 1.880, Abbe numbers of at least 29, densities lower than 4.1, good chemical durability and stability against devitrification, and an integrated transmission over the range of 380-800 nm at a thickness of 10 mm greater than 79%, the glasses consisting essentially, expressed in terms of weight percent on the oxide basis, of

| | |
|---|---|
| $SiO_2$ | 5-8 |
| $B_2O_3$ | 15-21 |
| $ZrO_2$ | 3-10 |
| $TiO_2$ | 7-17 |
| $Nb_2O_5$ | 20.5-26 |
| $ZrO_2 + TiO_2 + Nb_2O_5$ | 29-45 |
| $La_2O_3$ | 19-32 |
| $Y_2O_3$ | 0-9 |
| CaO | 8-16 |
| SrO | 0-5 |
| BaO | 0-5 |
| MgO | 0-5 |
| CaO + SrO + BaO + MgO | 8-16 |
| ZnO | 0-5 |
| $Li_2O$ | 0-2 |
| $Na_2O$ | 0-2 |
| $K_2O$ | 0-2 |
| $Li_2O + Na_2O + K_2O$ | 0-2. |

4 Claims, No Drawings

GLASSES WITH VERY HIGH INDEX OF REFRACTION AND LOW DENSITY

BACKGROUND OF THE INVENTION

The present invention relates to glass compositions for the manufacturing of lenses for optical and/or ophthalmic use, with an index of refraction ($n_d$) higher than 1.88, a low dispersion (Abbe number greater than or equal to 29), and a density lower than approximately 4.g/cm$^3$.

For spectacle glasses of high correction glasses, the use of a glass with an index of refraction of approximately 1.9 permits, when compared to glasses with a lower index of refraction (1.7, for example) and equal power, appreciable reduction of the thickness at the edge (when it is a matter of negative power lenses) and in the center (when it is a matter of positive power lenses).

This constitutes an undeniable advantage for the wearer of the spectacles, in particular in case of high corrections (>6 diopters). It is also known that increasing the index of refraction is generally accompanied by a deterioration of the other properties characteristic of the glass, and in particular the density increases. For a glass with high index to be able to retain the advantages of comfort mentioned above, it is necessary for its density not to be too high. Another disadvantage often associated with increasing the index is the increase of dispersion (or reduction of the Abbe number).

By reason of the above-mentioned constraints, and yet others regarding toxicity and cost, it is difficult to find satisfactory glass compositions with high index of refraction.

SUMMARY OF THE INVENTION

The present inventors have nevertheless succeeded in this and have found new glass compositions belonging to the family of the lanthanum borates, which, contrary to the majority of the other known glasses of this family, do not contain heavy metal oxides, such as $Ta_2O_5$ or PbO, or toxic metal oxides, such as $ThO_2$ or CdO, or very expensive oxides, such as $Gd_2O_3$ or $HfO_2$.

More precisely, the invention relates to glasses characterized by the fact that they exhibit an index of refraction higher than 1.880, an Abbe number of at least 29, a density lower than 4.1 g/cm$^3$ a low tendency towards crystallization, and an integrated transmission from 380 to 800 nm—at a thickness of 10 mm—higher than 79%; these glasses having the following basic chemical composition, expressed in weight percent on the oxide basis:

| | |
|---|---|
| $SiO_2$ | 5–8 |
| $B_2O_3$ | 15–21 |
| $ZrO_2$ | 3–10 |
| $TiO_2$ | 7–17 |
| $Nb_2O_5$ | 20.5–26 |
| $ZrO_2 + TiO_2 + Nb_2O_5$ | 29–45 |
| $La_2O_3$ | 19–32 |
| $Y_2O_3$ | 0–9 |
| CaO | 8–16 |
| SrO | 0–5 |
| BaO | 0–5 |
| MgO | 0–5 |
| CaO + SrO + BaO + MgO | 8–16 |
| ZnO | 0–5 |
| $Li_2O$ | 0–2 |
| $Na_2O$ | 0–2 |
| $K_2O$ | 0–2 |
| $Li_2O + Na_2O + K_2O$ | 0–2. |

The ranges of proportions mentioned above for the glass constituents are very important for obtaining the physical and chemical properties required for the contemplated application.

In particular, the introduction of $SiO_2$ into the composition allows the viscosity at the liquidus to be increased slightly and the chemical durability to be improved. A $SiO_2$ content higher than 5% is necessary to guarantee a good durability of the glass. The maximum $SiO_2$ content must not exceed 8%, the value beyond which the glass has a tendency to crystallize.

For a $B_2O_3$ content less than 15%, the composition is not very stable with regard to devitrification, and beyond 21% the high indexes expected are impossible to attain.

Among the oxides exercising a large contribution to the index of refraction, such as $ZrO_2$, $TiO_2$, and $Nb_2O_5$, a compromise must be found between the amounts of these three elements so as to maintain the claimed properties.

The presence of $ZrO_2$ allows the viscosity at the liquidus to be increased. A $ZrO_2$ content higher than 3% contributes to the chemical stability of the glass and improves the durability, but the tendency towards devitrification is accentuated for contents higher than 10%. $ZrO_2$ exhibits the disadvantage of increasing the density of the glass.

$TiO_2$ in contrast allows one to produce the best index-density compromise to be produced, and a $TiO_2$ content higher than 7% allows a low density to be maintained, but, with high contents, the transmission of the glass in the visible light range decreases; a characteristic yellow tint more or less pronounced as a function of the $TiO_2$ content is observed, and the Abbe number decreases rapidly. This is the reason why its content must not exceed 17 weight percent.

$Nb_2O_5$ also allows one to increase the index of refraction without excessively lowering the constringence; it therefore proves attractive, compared to $TiO_2$, in spite of its high price. Its content must not, however, exceed 26% in order to avoid devitrification of the glass.

A $Nb_2O_5$ content of at least 20.5% must be observed in order to obtain good durability, as well as a reduced tint and a good level of light transmission.

By maintaining the total $ZrO_2$, $TiO_2$, and $Nb_2O_5$ content between 29 and 45 weight percent, it is possible to assure a good compromise of transmission/durability properties.

$La_2O_3$ figures also among the oxides exercising a large contribution to the index of refraction in like manner to $ZrO_2$, $TiO_2$, and $Nb_2O_5$ considered above. This is the compound, however, which offers the best index-dispersion compromise. This is why it must be present in the glass in a proportion of at least 19 weight percent. Its content must not exceed 32 weight percent because beyond this the addition of $La_2O_3$ deviates disastrously with regard to the density and devitrification of the glass.

$Y_2O_3$ can optionally be introduced into the glass in order to increase the constringence and to improve the chemical stability. Because of its very high price, however, one prefers not to use it or to use it only in a small quantity in the glass. In any case, its weight content must not exceed 9% under pain of having a glass which is not very stable with regard to devitrification.

CaO, SrO, BaO, MgO, and ZnO are bivalent oxides exercising a moderate contribution to the index.

CaO, contrary to ZnO, SrO and BaO, allows one to avoid excessively increasing the dispersion and the density. For this reason, its content must be kept between 8 and 16 wt %. A CaO content of at least 8% is necessary to obtain an index of refraction higher than 1.88 with at the same time the other desired properties, particularly the Abbe number. It must not, however, exceed 16% under pain of decreasing the acid durability and promoting devitrification. SrO, BaO, and MgO are optional and must not be present in a proportion higher than 5% each. Moreover, when a combination of CaO, SrO, BaO and/or MgO is used, it must observe the following condition: $8 \leq CaO + SrO + BaO + MgO \leq 16$ weight percent so as to obtain the above-mentioned properties.

Just as for the other divalent oxides except CaO, ZnO is optional, and its content must not exceed 5 weight percent so as not to excessively increase the density.

The oxides of alkali metals $Li_2O$, $Na_2O$, and $K_2O$, with small contribution to the density, are optional and are only tolerable in small proportions because they lead to a rapid reduction of the index of refraction and, further, deteriorate the durability in acid medium of the glass and promote its devitrification. Thus, their content must be maintained at less than 2 weight percent.

Besides the ingredients above, the presence of arsenic ($As_2O_3$) and nitrates can be desirable for optimizing the state of oxidation-reduction of the glass and therefore of its tint and of its transmission, as is well known in the glass making industry in general.

Thus, for this purpose, a certain quantity of oxides can be introduced in the form of nitrates, and a proportion of $As_2O_3$ less than 0.5 weight percent can be introduced as a fining agent in the compositions of the invention.

In order to obtain glass having an excellent durability in acid medium, that is to say a weight loss in the test DIN 12116 less than 4000 mg/dm$^2$, the glass constituents will preferably be comprised within the ranges specified below:

| | |
|---|---|
| $SiO_2$ | 6–8 |
| $B_2O_3$ | 17–18 |
| $ZrO_2$ | 6–10 |
| $TiO_2$ | 7–11 |
| $Nb_2O_5$ | 20.5–26 |
| $ZrO_2 + TiO_2 + Nb_2O_5$ | 34–41 |
| $La_2O_3$ | 19–26 |
| $Y_2O_3$ | 0–8 |
| CaO | 12–16 |
| SrO | 0–5 |
| BaO | 0–5 |
| MgO | 0–5 |
| CaO + SrO + BaO + MgO | 12–16 |
| ZnO | 0–5 |
| $Li_2O$ | 0–2 |
| $Na_2O$ | 0–2 |
| $K_2O$ | 0–2 |
| $Li_2O + Na_2O + K_2O$ | 0–2. |

DESCRIPTION OF PREFERRED EMBODIMENT

The invention is illustrated by the nonlimiting examples given in Table I. The preferred example is No. 5. All the proportions are expressed in weight percentage.

PREPARATION OF THE GLASSES

The various oxides constituting the glass are supplied by the batch materials specified below:

| Oxides | Batch materials |
|---|---|
| $SiO_2$ | Quartz |
| $B_2O_3$ | $B(OH)_3$ |
| $ZrO_2$ | $ZrO_2$ |
| $TiO_2$ | $TiO_2$ |
| $Nb_2O_5$ | $Nb_2O_5$ |
| $La_2O_3$ | $La_2O_3$ |
| $Y_2O_3$ | $Y_2O_3$ |
| CaO | $CaCO_3$, $Ca(NO_3)_2$ |
| SrO | $SrCO_3$ |
| BaO | $BaCO_3$, $Ba(NO_3)_2$ |
| MgO | $MgCO_3$ |
| ZnO | ZnO |
| $Li_2O$ | $Li_2CO_3$ |
| $Na_2O$ | $Na_2CO_3$, $NaNO_3$ |
| $K_2O$ | $K_2CO_3$, $KNO_3$ |

Preferably, one will choose batch materials so as to exclude as much as possible the presence of oxides of transition metals, in particular $Fe_2O_3$, whose total content analyzed is advantageously kept less than 10 ppm, in order that the glass obtained exhibits an integrated transmission within the limits defined above.

After weighing, the various batch materials are mixed according to current techniques. The mixture is then put in a kiln in a platinum crucible at a temperature of approximately 1200° C. When it is completely melted, the temperature of the melt is brought to approximately 1250°–1300° C. for homogenization and fining. The glass melt is then cooled to the temperature corresponding to the viscosity suitable for molding and casting in the form of a bar.

The total duration of the operation is on the order of 2-7 hours. After molding, the glass is annealed at approximately 600°–650° C. with a rate of cooling of 60° C./hour. The properties of the glass are then determined as described below.

MEASUREMENTS OF THE PHYSICAL AND CHEMICAL PROPERTIES OF THE GLASS

The measurements of index of refraction and Abbe number are carried out according to the usual methods (for $n_d$, the yellow line of Hc is used) on annealed samples. The density is measured with the aid of a Micrometrics helium pycnometer.

The integrated transmission of the glass from 380–800 nm is determined on a polished sample of 10 mm thickness with the aid of a Perkin-Elmer Lambda 9 spectrophotometer.

The durability in acid medium is evaluated by the test of the standard DIN 12116. It consists of determining the weight loss of a polished sample, immersed for 6 hours in boiling 6N hydrochloric acid. The weight loss is expressed in mg/dm$^2$.

| | Example (weight %) | | | | | | | | | |
|---|---|---|---|---|---|---|---|---|---|---|
| | 1 | 2 | 3 | 4 | 5 | 6 | 7 | 8 | 9 | 10 |
| $La_2O_3$ | 23.1 | 24.1 | 21.2 | 21.8 | 22.6 | 24.2 | 22.8 | 22.6 | 22.6 | 22.6 |

-continued

|  | Example (weight %) | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| $Nb_2O_5$ | 23.5 | 21.2 | 23.4 | 23.7 | 23.2 | 21.3 | 23.4 | 23.2 | 23.2 | 23.2 |
| $TiO_2$ | 7.4 | 8.6 | 7.5 | 7.5 | 7.5 | 8.6 | 7.5 | 7.5 | 7.5 | 7.5 |
| $ZrO_2$ | 8.3 | 8.3 | 9.2 | 8.3 | 9.1 | 8.2 | 9.2 | 9.1 | 9.1 | 9.1 |
| $B_2O_3$ | 17.2 | 16.7 | 17.5 | 17.5 | 18.0 | 16.3 | 17.7 | 18.0 | 18.0 | 18.0 |
| $SiO_2$ | 5.6 | 7.2 | 6.1 | 6.1 | 6.0 | 7.2 | 6.1 | 6.1 | 6.1 | 6.1 |
| CaO | 14.9 | 14.0 | 15.1 | 15.1 | 13.5 | 13.4 | 12.9 | 8.5 | 8.5 | 8.5 |
| $Li_2O$ |  |  |  |  |  | — | 0.4 | — | — | — |
| $Na_2O$ |  |  |  |  |  | 0.8 | — | — | — | — |
| SrO |  |  |  |  |  | — | — | 5.0 | — | — |
| BaO |  |  |  |  |  | — | — | — | 5.0 | — |
| ZnO |  |  |  |  |  | — | — | — | — | 5.0 |
| $n_d$ | 1.889 | 1.885 | 1.884 | 1.884 | 1.883 | 1.881 | 1.885 | 1.883 | 1.886 | 1.889 |
| Abbe No. | 30.5 | 30.6 | 30.5 | 30.6 | 30.6 | 30.4 | 30.1 | 29.9 | 29.6 | 29.6 |
| Density $gkm^3$ | 4.01 | 4.00 | 3.96 | 3.97 | 3.99 | 3.98 | 3.98 | 4.04 | 4.04 | 4.05 |
| T% (10 mm) 380–800 nm | 80.8 | 80.4 | 80.4 | 80.4 | 80.7 | 81.0 | — | — | — | — |
| Acid Durability ($mg/dm^2$) | 3421 | 2904 | 2918 | 3410 | 2785 |  |  |  |  |  |

We claim:

1. Glasses characterized by the fact that they exhibit an index of refraction higher than 1.880, an Abbe number of at least 29, a density lower than 4.1 g/cm³, a good chemical durability and a lower tendency towards crystallization, and an integrated transmission from 380–800 nm—at a thickness of 10 mm—higher than 79%, these glasses consisting essentially, expressed in weight percent on the oxide basis, of

| | |
| --- | --- |
| $SiO_2$ | 5–8 |
| $B_2O_3$ | 15–21 |
| $ZrO_2$ | 3–10 |
| $TiO_2$ | 7–17 |
| $Nb_2O_5$ | 20.5–26 |
| $ZrO_2 + TiO_2 + Nb_2O_5$ | 29–45 |
| $La_2O_3$ | 19–32 |
| $Y_2O_3$ | 0–9 |
| CaO | 8–16 |
| SrO | 0–5 |
| BaO | 0–5 |
| MgO | 0–5 |
| CaO + SrO + BaO + MgO | 8–16 |
| ZnO | 0–5 |
| $Li_2O$ | 0–2 |
| $Na_2O$ | 0–2 |
| $K_2O$ | 0–2 |
| $Li_2O + Na_2O + K_2O$ | 0–2. |

2. Glass according to claim 1, characterized by the fact that it consists essentially, expressed in terms of weight percent on the oxide basis, of

| | |
| --- | --- |
| $SiO_2$ | 6–8 |
| $B_2O_3$ | 17–18 |
| $ZrO_2$ | 6–10 |
| $TiO_2$ | 7–11 |
| $Nb_2O_5$ | 20.5–26 |
| $ZrO_2 + TiO_2 + Nb_2O_5$ | 34–41 |
| $La_2O_3$ | 19–26 |
| $Y_2O_3$ | 0–8 |
| CaO | 12–16 |
| SrO | 0–5 |
| BaO | 0–5 |
| MgO | 0–5 |
| CaO + SrO + BaO + MgO | 12–16 |
| ZnO | 0–5 |
| $Li_2O$ | 0–2 |
| $Na_2O$ | 0–2 |
| $K_2O$ | 0–2 |
| $Li_2O + Na_2O + K_2O$ | 0–2. |

3. Glasses according to claim 1, characterized by the fact that they also contain up to 0.5 wt % $As_2O_3$.

4. Glasses according to claim 1, characterized by the fact that they contain a maximum of 10 ppm of $Fe_2O_3$.

* * * * *